Sept. 10, 1963 H. E. WULF 3,103,233
SLIDER VALVE WITH SIDE WIPERS
Filed Oct. 10, 1960 2 Sheets-Sheet 1
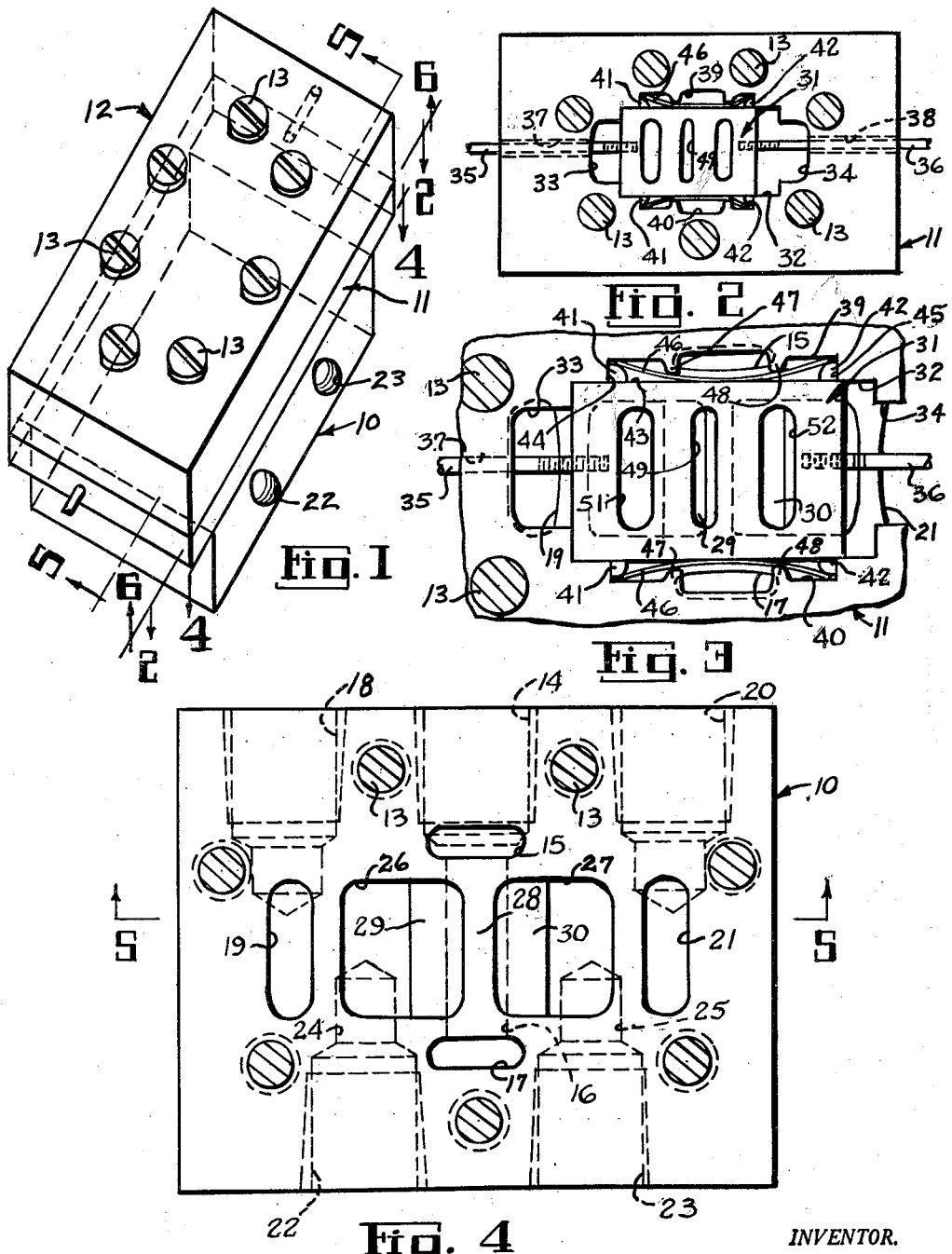
INVENTOR.
HURST E. WULF
BY
Donnelly, Dyrenteg & Harrington
ATTORNEYS Sept. 10, 1963     H. E. WULF     3,103,233

SLIDER VALVE WITH SIDE WIPERS

Filed Oct. 10, 1960     2 Sheets-Sheet 2

INVENTOR.
HURST E. WULF
BY
Donnelly, Mentag & Harrington
ATTORNEYS

# United States Patent Office 3,103,233
Patented Sept. 10, 1963

3,103,233
SLIDER VALVE WITH SIDE WIPERS
Hurst E. Wulf, 15000 Rosemont Blvd., Detroit, Mich.
Filed Oct. 10, 1960, Ser. No. 61,559
5 Claims. (Cl. 137—625.25)

This invention relates to improvements in the slider valve art, and more particularly to an improved slider valve construction incorporating sealing wipers or rods to provide an effective seal between the sliding valve member and elements of the valve body.

In constructing a slider valve notably in a pressure actuated valve, it is necessary to provide clearances between the valve body elements and the slider or sliding valve member as small and as leakproof as possible, the clearances between rectangular envelope of the valve body and the rectangular-like side projections of the slider must be contained on as many as four sides for close, low leakage clearances. However, the provision of such minimum clearance in the prior art valves entails high machining costs. Accordingly, it is the primary object of the present invention to provide a slider valve in which the need for close tolerance machining to provide close fits along the sealing surfaces of the valve would be kept to a minimum or removed, and yet wherein an effective seal is still provided between the sliding valve member and the body of the valve. An element referred to as a sealing wiper or rod is provided which in addition to providing adjustable positive sealing characteristics between the sealing surface or surfaces of the valve and the enveloping valve body serves a multiplicity of other valuable purposes as described herewith.

The sealing wipers or rods whose cross section may be substantially rectangular, circular, or be described as a solid rectangular insert of flexible or non-flexible material which are mounted along the sides of the sliding valve member and are continually biased into sealing engagement between the sliding valve member and the valve body initially by spring pressure and thence fluid pressure, or by fluid pressure alone.

The sealing wipers or rods provide a novel and new concept in the art of "actuating valve force" compensation. By presenting an adjustable pressure area for valve actuation by using the area defined by the position of the adjustable pins on the sealing surface of the slider, accurate compensation and complex motivation is provided. Those experienced in the art of servo valve engineering can immediately appreciate the new degree of control possible in error compensation by the use of this new novel and useful concept of a variable actuating area proportional to valve motion.

It is the further objective of the present invention to provide an improved slider valve construction that permits such hereinbefore mentioned difficulties to be overcome to obtain valve constructions such as a differential area flow valve at a low inexpensive machining cost.

It is another object of the present invention to provide an improved slider valve construction employing novel sealing wipers or rods and which valve construction is simple and compact, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is an elevational perspective view of a slider valve made in accordance with the principles of the invention;

FIG. 2 is a horizontal sectional view of the valve structure illustrated in FIG. 1, taken along the line 2—2 thereof and looking in the direction of the arrows;

FIG. 3 is a fragmentary enlarged view of part of the structure illustrated in FIG. 2;

FIG. 4 is a horizontal sectional view of the structure illustrated in FIG. 1, taken along the line 4—4 thereof and looking in the direction of the arrows;

Figure 5:
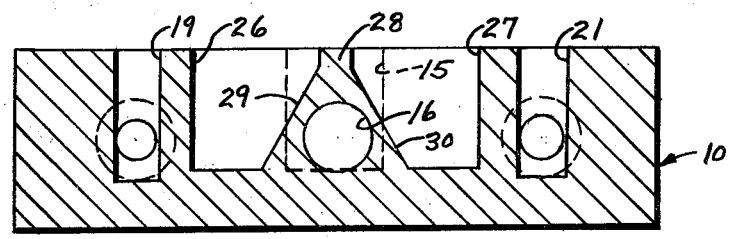
FIG. 5 is an elevational sectional view of the structure illustrated in FIG. 4, taken along the line 5—5 thereof and looking in the direction of the arrows.
Figure 6:
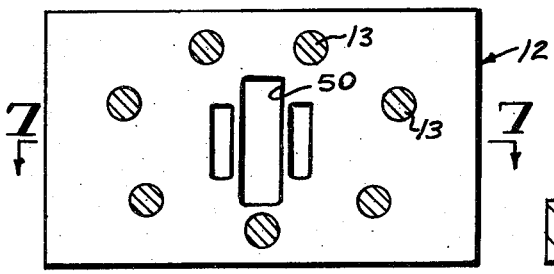
FIG. 6 is a horizontal sectional view of the structure illustrated in FIG. 1, taken along the line 6—6 thereof and looking in the direction of the arrows.
Figure 7:
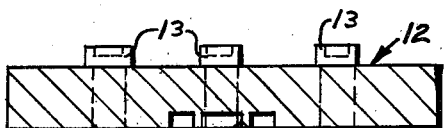
FIG. 7 is an inverted sectional view of the structure illustrated in FIG. 6, taken along the line 7—7 thereof and looking in the direction of the arrows.

Referring now to the drawings, and in particular to FIGS. 1, 2 and 3, wherein is shown an illustrative embodiment of the invention, the numeral 10 generally indicates the valve manifold block or base on which is mounted the spacer plate generally indicated by the numeral 11. A cover plate generally indicated by the numeral 12 is disposed on top of the spacer plate 11 and is secured thereto and to the manifold base 10 by means of a plurality of bolts 13.

The valve shown in FIGS. 1 through 7 is illustrative of the slider valve structure which may be provided with side wipers in accordance with the principles of the invention. The manifold base 10 contains the fluid inlet and outlet ports and connecting conduits, and, the spacer plate 11 contains the sliding valve member for controlling the flow of fluid through the manifold base 10, as more fully explained hereinafter.

As shown in FIGS. 1, 4 and 5, the base 10 is provided with the pressurized fluid inlet port 14 which is connected to the upwardly extended conduit 15 and also to a second upwardly extended conduit 17 by means of the horizontal interconnecting passage 16. The conduits 15 and 17 are disposed opposite each other in spaced apart transverse positions.

Disposed at opposite sides of the pressure inlet 14 are the exhaust outlet ports 18 and 20 which are connected to the upwardly extended longitudinally spaced apart vertical conduits 19 and 21, respectively. As shown in FIG. 4, the ports 14, 18 and 20 are disposed at one side of the manifold base 10. A pair of ports 22 and 23 are formed on the side of the manifold base which is opposite to the side wherein the previously mentioned ports are formed. The ports 22 and 23 are connected to the passages 24 and 25 which are in turn connected to the upwardly extended vertical conduits 26 and 27, respectively. The ports 22 and 23 are provided with pipe threading for the reception of tubes or other conduits to connect the valve to an apparatus to be supplied with fluid under pressure, as for example, the opposite ends of a fluid cylinder whereby the fluid under pressure may be alternately supplied and exhausted to and from a hydraulic cylinder.

As shown in FIG. 5, the conduits 26 and 27 are spaced apart by the wall 28 which is provided with the tapered side walls 29 and 30. The conduits 26 and 27 are also spaced apart from the exhaust conduits 19 and 21 and they are in longitudinal alignment therewith whereby the flow of fluid therebetween may be controlled by the slider valve shown in FIGS. 2 and 3 and generally indicated by the numeral 31. The slider valve is formed in the shape of a rectangular plate which is slidably mounted in the rectangularly shaped chamber 32 for endwise movement therein. The chamber 32 comprises a hole formed through the spacer plate 11 and is provided with a pair of communicating extensions or recesses 33 and 34 at the opposite longitudinal ends thereof. The slider plate or slide valve member 31 is adapted to be moved in the chamber 32 by means of the control shifter rods 35 and 36 which extend inwardly through suitable apertures 37 and 38 formed in opposite ends of the spacer plate 11. The inner ends of the rods 35 and 36 are threadably mounted in the ends of the plate 31 and a suitable sealing means may be mounted in the holes 37 and 38 to prevent leakage past the rods 35 and 36.

A second pair of recesses 39 and 40 are formed on the opposite transverse sides of the slider plate chamber 32 and they are in communication therewith. A pair of sealing pins or wipers 41 and 42 are mounted in the recess 39 so as to be slidably engaged with the side 43 of the slider plate 31. As shown in FIGS. 2 and 3, the wiper members 41 and 42 are also in contact with the end surfaces of the recess 39 as indicated by the numerals 44 and 45. The sealing wipers 41 and 42 are adapted to be held in the aforementioned operative positions by means of the leaf spring 46 and the fluid under pressure being controlled by the valve as more fully explained hereinafter. As shown in FIGS. 2 and 3, the spring 46 is disposed with the ends thereof behind the sealing pins 41 and 42 so as to bias the pins inwardly toward the slider plate 31. The spring 46 is disposed around the projections 47 and 48 so as to put the spring under tension so that the ends thereof will bias the pins 41 and 42 into the aforementioned operative position. A similar pair of sealing pins or wipers are also provided in the other recess 40 so as to slidably engage the other side of the slider plate 31. The sealing pins in the recess 40 are also biased into their operative position by means of a spring and projection structure similar to that in the recess 39, and the corresponding structure has been marked with similar reference numerals.

As shown in FIGS. 2 and 3, the slider plate 31 is provided with the centrally disposed transversely extended hole therethrough as 49, which is adapted to be in communication at all times with the fluid pressure inlet conduits 15 and 17 by means of the transverse recess 50 formed in the lower side of the cover plate 12. The recess 50 extends transversely a distance sufficient to overlap and communicate with the portions of the slider plate recesses 39 and 40 which lie between the inwardly extended fingers or projections 47 and 48. As shown in FIG. 3, the inlet conduits 15 and 17 communicate with the aforementioned portions of the slider plate recesses 39 and 40. The slider plate 31 is further provided with the fluid control openings 51 and 52 which are also formed completely through the plate 31 and which are longitudinally spaced apart from the opening or slot 49 and which extend transversely of the plate 31.

It will be seen that when the shifter pin 36 moves the slider plate 31 to the position shown in FIGS. 2 and 3, the fluid under pressure will enter the port 14 and pass through the conduits 15 and 17, and into the recess 50 from whence it will flow through the slot 49 downwardly into the conduit 26 and out through the passage 24 and the port 22 to a fluid apparatus to be supplied with pressurized fluid. Simultaneously another part of the aforementioned apparatus may be exhausted through the port 23, the passage 25, and the conduit 27 from whence it will flow directly into the conduit 21 and out the exhaust port 20. When the slider plate 31 is moved to the right end position as viewed in FIG. 3, the pressurized fluid will be directed in the same manner out of the port 23 and the port 22 would exhaust the fluid operated apparatus out through the port 18. The fluid under pressure will at all times be acting in the recesses 39 and 40 so as to urge the pins 41 and 42 into sliding engagement with the end walls of the recesses and the slider plate to provide an efficient sealing action. The pins are moved into their sealing positions by means of the pressure of the fluid being controlled so as to prevent leakage past the sides of the slider plate and the spacer plate. The slider pins extend upwardly into sliding engagement with the cover plate 12 and downwardly into sliding engagement with a manifold base 10. Experience has shown that the use of sealing pins or wipers as 41 or 42 provides an efficient sealing means for a slider valve of the type disclosed. It will be understood that although quarter-round sealing pins have been illustrated for the pins 41 and 42, that any other suitable cross-sectional shape may be employed.

Figure 8:
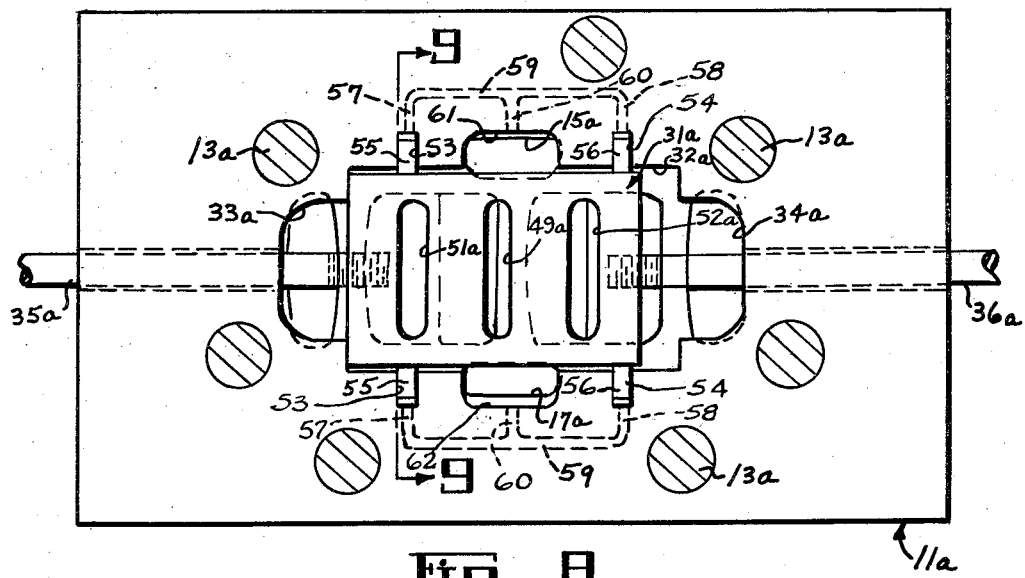
FIG. 8 is an enlarged horizontal sectional view, similar to FIG. 2, and showing a second embodiment of the invention; and, FIG. 9 is a fragmentary elevational sectional view of the structure illustrated in FIG. 8, taken along the line 9—9 thereof and looking in the direction of the arrows.
Figure 9:
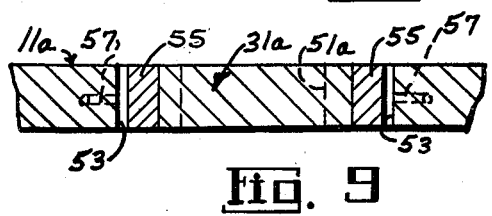

FIGS. 8 and 9 illustrate the second embodiment of the invention wherein the wiper pins are moved into sealing position by means of fluid pressure directed on the rear side of the pins so as to force them into sealing engagement with the movable valve member. The fluid pressure acting on the back of the pins is directed thereto by a separate pressure conduit. This fluid pressure controls the movement of the pins laterally across the valves while the pressure fluid tending to pass longitudinally through the clearance between the valve body and the slider plate will force the pins into position longitudinally as in the first described specie.

In the embodiment of FIGS. 8 and 9, the various structural elements which are similar to the structural elements of the first embodiment are marked with corresponding numerals followed by the small letter "a." The valve structure of the second specie is substantially the same as the structure of the first specie with the exception that the side recesses as 39 and 40 in the first embodiment are eliminated. As shown in FIGS. 8 and 9, a pair of transverse slots 53 and 54 are formed in each side of the slider plate chamber 32a adjacent each end thereof. Slidably mounted in the slots 53 and 54 are the wiper blades or wiper members 55 and 56, respectively, which are rectangular in cross section and slidably engaged on their upper ends to the cover plate of the valve and on the lower ends thereof to the manifold base of the valve.

The presure conduit is connected to the rear end of each of the slots 53 and 54 as indicated by the numerals 57 and 58, and these pressure conduits are connected to a further conduit 59 which is in turn connected by a conduit 60 to the recess 61. These pressure conduits on the other side of the valve are connected to a similar recess as 62. The recesses 61 and 62 are formed on each side of the slider plate chamber 32a and extend outwardly therethrough and are in communication with the conduits 15a and 17a respectively. It will be seen that pressure fluid will enter the conduit 60 from the recesses 61 and 62 and force the wiper members 55 and 56 into sliding engagement with the slider plate 31a and with the pressure fluid from the recesses 61 and 62 tending to pass past the slider plate 31a will engage the wiper pins and move them longitudinally into sealing engagement with the ends of their corresponding slots.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

It will be understood that the term valve body member includes the manifold base block 10, the spacer plate 11, and the cover plate 12. The wipers may be made from flexible or non-flexible material.

What I claim is:

1. In a slider valve construction, the combination of: a valve body member; a plurality of fluid conduits in the lower end of said valve body member; a rectangular sliding valve member mounted in said valve body member above said fluid conduits for controlling the flow of fluid through said conduits; a plurality of sealing wipers mounted in a plurality of recesses in said valve body member along the opposite sides of said sliding valve member and having flat sides for sealing engagement with the valve body member and having flat sides for sealing engagement with the rectangular sliding valve member to prevent passage of fluid therebetween; and, means for urging the sealing wipers into sealing engagement against said sliding valve member and said valve body member.

2. The structure as defined in claim 1, wherein: said valve body member includes a base manifold member in which are formed said fluid conduits, a spacer plate, and a cover plate; means for fixing said base member, spacer plate and cover plate together; and, said spacer plate having a substantially rectangular opening therethrough for the reception of said sliding rectangular valve member.

3. The structure as defined in claim 2, wherein: said valve is provided with means for moving said sliding valve member.

4. The structure as defined in claim 1, wherein: said means for urging the sealing wipers into sealing engagement against said sliding valve member and said valve body member comprises one of said fluid conduits which is a pressure fluid conduit and which is in communication with said sealing wiper recesses.

5. In a slider valve construction, the combination of: a valve body member; a plurality of fluid conduits in the lower end of said valve body member; a rectangular sliding valve member mounted in said valve body member above said fluid conduits for controlling the flow of fluid through said conduits; a plurality of sealing wipers mounted in a plurality of recesses in said valve body member along the opposite sides of said sliding valve member and having flat sides for sealing engagement with the valve body member and having flat sides for sealing engagement with the rectangular sliding valve member to prevent passage of fluid therebetween; and, means for urging the sealing wipers into sealing engagement against said sliding valve member and said valve body member comprising one of said fluid conduits which is a pressure fluid conduit and which is in communication with said sealing wiper recesses, and, a spring means in said recesses for maintaining said sealing wipers in place.

References Cited in the file of this patent
UNITED STATES PATENTS

| | | |
|---|---|---|
| 2,506,111 | Saint | May 2, 1950 |
| 2,830,619 | Hollander | Apr. 15, 1958 |
| 2,875,782 | Shih-Ying-Lee | Mar. 3, 1959 |
| 2,910,050 | Dotter et al. | Oct. 27, 1959 |
| 2,938,704 | Quail | May 31, 1960 |
| 2,967,514 | Riester | Jan. 10, 1961 |